Figure 1:
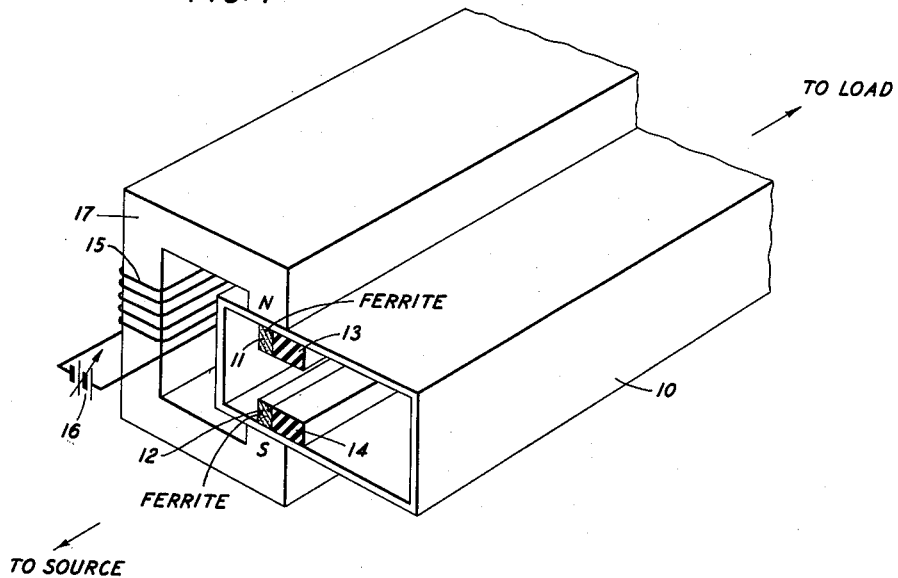

Nov. 6, 1962

M. T. WEISS 3,063,028

ENHANCED GYROMAGNETIC EFFECT IN NONRECIPROCAL
WAVE TRANSMISSION

Filed May 5, 1960

2 Sheets-Sheet 1

INVENTOR
M. T. WEISS
BY
ATTORNEY

Nov. 6, 1962   M. T. WEISS   3,063,028
ENHANCED GYROMAGNETIC EFFECT IN NONRECIPROCAL
WAVE TRANSMISSION
Filed May 5, 1960   2 Sheets-Sheet 2

INVENTOR
M. T. WEISS
BY *Roy M. Porter Jr.*
ATTORNEY

United States Patent Office 3,063,028
Patented Nov. 6, 1962

3,063,028
ENHANCED GYROMAGNETIC EFFECT IN NON-RECIPROCAL WAVE TRANSMISSION
Max T. Weiss, Los Angeles, Calif., assignor to Bell Telephone Laboratories, Incorporated, New York, N.Y., a corporation of New York
Filed May 5, 1960, Ser. No. 27,223
2 Claims. (Cl. 333—24.2)

This application is a continuation-in-part of my prior application, Serial No. 549,795, and now abandoned, filed November 29, 1955. The invention relates to improved nonreciprocal gyromagnetic components for electromagnetic wave transmission systems and, more particularly, to nonreciprocal attenuating devices and nonreciprocal phase shifting devices employing the gyromagnetic properties of certain gyromagnetic materials.

It has been proposed to place an element of gyromagnetic material, such as ferrite, in the path of and asymmetrically in the field pattern of electromagnetic wave energy and to bias this material to the point at which it becomes resonant in a gyromagnetic sense to the frequency of the applied wave energy. When microwaves propagating in one direction are applied to such a path they are greatly attenuated, but when they are propagating in the other direction little or no attenuation is observed. Such devices are known in the art as isolators. On the other hand, if the element is biased at a field strength other than that required for resonance, the device produces a nonreciprocal phase shift, i.e., it introduces a substantial amount of phase shift to energy propagating in one direction and little phase shift or a phase shift of the opposite sense to wave energy propagating in the other direction. Either as an isolator or as a phase shifter, it is often desirable that the effects for each of the respective directions be as large as possible and/or as greatly different from each other as possible.

It is therefore an object of the present invention to enhance the nonreciprocal effect of devices employing magnetically biased elements of gyromagnetic material.

It is a more specific object to increase the isolation ratio of gyromagnetic resonance isolators.

It is a further more specific object to increase the differential phase shift obtainable from a given amount of gyromagnetic material in a nonreciprocal phase shifter.

The devices of the preceding types derived their nonreciprocity from the fact that in a rectangular wave guide there is a plane parallel to the narrow wall thereof in which the radio frequency magnetic field of energy supported in the guide has a transverse field component and a longitudinal field component of equal amplitudes. The two components are out of phase by 90 degrees so that the net field is circularly polarized and appears to rotate in one sense for one direction of propagation along the guide and in the opposite sense for propagation in the opposite direction. Gyromagnetic material located in this plane reacts in respectively different ways with the components rotating in the opposite senses. However, a gyromagnetic element of finite dimensions occupies a region sufficiently broader than this plane so that all of the field within the element cannot be purely circularly polarized and rotate only in the desired sense. Such a region will also include a minority of components that appear to rotate in a sense opposite to the preferred and dominating sense, as illustrated in FIG. 26 of the article "Behavior and Applications of Ferrites in the Microwave Region," by A. G. Fox, S. E. Miller, and the present applicant, appearing in the January 1955 issue of the Bell System Technical Journal. These minority components are primarily responsible for diluting the nonreciprocal effect in the device, such as by increasing the forward loss in an isolator and decreasing its isolation ratio.

In accordance with the present invention, it has been found that by locating an element of material having a relatively high dielectric constant contiguous to and on the proper side of a gyromagnetic element at least partially surrounded by a medium having a low dielectric constant, the effect of the gyromagnetic element upon the wave energy is substantially increased. The term "relatively high dielectric constant" is understood to refer to dielectric constant values closer to the dielectric constant of the gyromagnetic element than to the dielectric constant of the surrounding medium. Observable phenomena can be explained by the theory that the dielectric element perturbs the magnetic field components of the wave that pass through it to produce additional longitudinal components having one sense on one side of the dielectric element and the opposite sense on the opposite side. Obviously such a perturbation occurs in significant amounts only when the dielectric element has a substantial thickness between the sides at which the production of additional components is desired. Thus on one side of the dielectric element the additional longitudinal components tend to add with the longitudinal components of the unperturbed wave to extend the region in which the transverse and longitudinal components are equal and thus to increase the amount of circular polarization rotating in the predominate sense. Thus when the gyromagnetic element is located on this side of the dielectric element, the amount of the desired circular polarization within the gyromagnetic element is increased with a corresponding increase in its nonreciprocal effect.

In accordance with another embodiment of the invention, two elements of dielectric material are located one on either side of the gyromagnetic element. The second dielectric element further increases the degree of circular polarization within the gyromagnetic element for further improvement of operation for certain applications.

A feature of the invention resides in the use of a pair of gyromagnetic elements located respectively next to the top and bottom wide walls of the guide. In one embodiment these elements have different dimensions for broadening the operating frequency band of the device.

These and other objects and features, the nature of the present invention, and its various advantages, will appear more fully upon consideration of the specific illustrative embodiments shown in the accompanying drawings and described in detail in the following explantion of these drawings.

Figure 2:
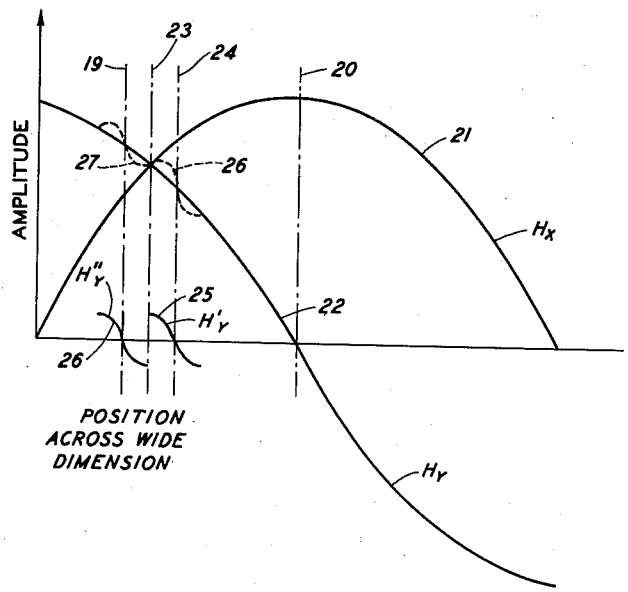

In the drawings:

FIG. 1 is a perspective view of a preferred embodiment of the invention showing the relative locations and dimensions of the gyromagnetic element and the dielectric element in a rectangular wave guide;

FIG. 2, given by way of explanation, represents the amplitudes of the transverse and longitudinal magnetic field components at positions across the wide dimension of a rectangular wave guide; and FIGS. 3 through 7 are transverse cross sectional views of wave guide structures representing modifications of the embodiment of FIG. 1.

Referring more specifically to FIG. 1, a nonreciprocal device is shown as an illustrative embodiment of the present invention which may be operated either as an isolator or as a phase shifter. Initially assuming performance as an isolator, the structure comprises a section 10 of conductive reactangular wave guide which is to be interposed in the path of linearly polarized wave energy requiring isolation, such as between a source and a load. Guide 10 has conductive wide walls of internal transverse dimension of at least one half wavelength of the energy to be conducted thereby and narrow walls of internal transverse dimension substantially one half the wide dimension. Located in guide 10 and centered therein at an asymmetrical position displaced somewhat more than one quarter of the width of guide 10 to the left-hand side of the center line thereof is a pair of elongated gyromagnetic elements 11 and 12 running adjacent to respectively opposite and aligned portions of the top and bottom walls of guide 10. Elements 11 and 12 extend longitudinally along guide 10 for an interval of several wavelengths and each has a transverse cross section of rectangular shape having a small width dimension extending parallel to the wide walls of guide 10 and a large height dimension extending parallel to the narrow dimension of guide 10. The height of elements 11 and 12 is of the order of one quarter to one third of the narrow dimension of guide 10 and the width of elements 11 and 12 is several times smaller than the height thereof. Located adjacent to the right-hand face of each element 11 and 12, i.e., at the sides of elements 11 and 12 toward the center of guide 10, are elongated elements 13 and 14, respectively, of any well known nonconductive material having a high dielectric constant, preferably of the same order of magnitude as, or greater than, the dielectric constant of the gyromagnetic material. In this specification the dielectric constant of the dielectric material is understood to be "of the same order of magnitude" as the dielectric constant of the gyromagnetic material when the dielectric constant of the dielectric material is more nearly equal to that of the gyromagnetic material than it is to any other dielectric material in the vicinity of the gyromagnetic material. In practice it has been found that the material marketed under the trade name Stycast with dielectric constants of the order of twelve or fifteen is particularly suitable. Dielectric elements 13 and 14 each have heights that are comparable to those of elements 11 and 12 and widths that may be comparable to or several times larger than the width of elements 11 and 12. The dimensions are understood to be "comparable" when the transverse cross sectional area of the dielectric element represents at least a major portion of the transverse cross sectional area of the gyromagnetic element. The precise relative proportions of all elements are best obtained, however, by empirical methods that take into account the fixed parameters of the materials of the elements. The remainder of guide 10 is filled by a dielectric medium of low dielectric constant, substantially less than the dielectric constant of either elements 11 and 12 or 13 and 14, such as air.

The material of elements 11 and 12 is of the type having electrical and magnetic properties of the type described by the mathematical analysis of D. Polder in Philosophical Magazine, January 1949, volume 40, pages 99 through 115. These materials are characterized by the fact that they exhibit gyromagnetic properties at microwave frequencies and may therefore be spoken of as gyromagnetic material. The term gyromagnetic material is employed here in its accepted sense as designating the class of materials having portions of the atoms thereof that are capable of exhibiting a significant precessional motion at frequencies within the microwave frequency range, this precessional motion having an angular momentum, a gyroscopic moment, and a magnetic moment. Included in this class of materials are ionized gaseous media, paramagnetic materials and non-conducting ferromagnetic materials. More specifically, elements 11 and 12 may comprise iron oxide with some of the oxides of one or more bivalent metals such as nickel, magnesium, zinc, manganese, and aluminum, combined in a spinel crystal structure. This material is known as a ferromagnetic spinel or as ferrite. Some times these materials are first powdered and then molded with a small percentage of a plastic binder. Hereinafter the term "ferrite" will be used exclusively as descriptive of the material but it will be understood that equivalent materials having similar gyromagnetic properties may be used to practice the invention.

Elements 11 and 12 are biased or polarized by an externally applied transverse magnetic field at right angles to the direction of propagation of the wave energy in guide 10. As illustrated, this field is supplied by a C-shaped solenoid structure comprising a magnetic core 17 having pole-pieces N and S bearing against the top and bottom walls of guide 10. Turns of wire 15 on core 17 are so wound and connected to a source 16 of variable potential to produce a magnetizing field of this polarity. The field may be provided by a solenoid of other suitable physical design, by a permanent magnet structure, or the ferrite material of elements 11 and 12 may be permanently magnetized, if desired. In subsequent figures this field is indicated schematically by a vector labeled $H_{DC}$.

The theory and operation of the embodiment of FIG. 1 may best be explained by reference to FIG. 2. It will be recalled that the high frequency magnetic field pattern of the linearly polarized dominant mode wave in a rectangular wave guide such as guide 10 of FIG. 1 forms loops which lie in planes parallel to the wide dimension of the guide. The amplitude of transverse components $H_x$ of the field, as represented by curve 21 of FIG. 2, is zero at the narrow walls and maximum in the center plane 20 extending parallel to the narrow walls. The amplitude of the longitudinal component $H_y$ is maximum at the narrow walls and zero in center plane 20, as represented by curve 22 of FIG. 2. In the longitudinal plane represented by 23 displaced to one side of and parallel to the center plane 20, $H_x$ and $H_y$ are of equal amplitudes and, since they are 90 degrees out of phase, their sum produces a component that is circularly polarized and rotates clockwise in space as the wave propagates in one direction along the guide and rotates counterclockwise for propagation in the opposite direction. As is disclosed in the copending applications of W. H. Hewitt, Serial No. 362,191 filed June 17, 1953, and S. E. Miller, Serial No. 362,193 filed June 17, 1953, the gyrating electrons in ferrite elements 11 and 12 located in plane 23 will couple strongly with the high frequency magnetic field rotating in the clockwise direction but will be substantially unaffected by the field rotating in the counterclockwise direction. Accordingly, there will be substantial differences in the observed characteristics for the two directions of propagation. When the frequency of the high frequency energy is equal to the resonant frequency of the electrons as determined by the strength of the biasing field, the loss or attenuation characteristic is maximum.

Immediately on either side of plane 23 the $H_x$ and $H_y$ components are unequal and while the field appears to have a predominantly circularly polarized component rotating in one direction, it also includes components rotating in the opposite direction. Since elements 11 and 12 are of finite thicknesses and therefore extend into the regions on each side of plane 23, substantial amounts of these other components are included within the elements.

In accordance with the invention, dielectric elements 13 and 14 are located adjacent to elements 11 and 12. The sharp impedance discontinuity between dielectric elements 13 and 14 and the low dielectric constant medium filling the remainder of guide 10 and at least partially surrounding elements 13 and 14, causes each dielectric element to perturb the components passing through it and to act as a dielectric wave guide supporting a wavelet of energy having closely confined longitudinal components. A typical amplitude distribution of the newly generated longitudinal components is shown by curve 25 of FIG. 2 for a dielectric element centered about a plane 24 between planes 23 and 20. The sense of the $H'_y$ components is controlled by the sense of the dominant mode component on the side of the dielectric element farthest removed from center plane 20 where the $H_y$ components have the larger amplitude. The sum of components $H'_y$ and $H_y$ is represented by the dotted characteristic 26 which shows that between planes 23 and 24 the amplitude of the total longitudinal component has been increased, thus decreasing the amplitude difference between the transverse and longitudinal components and increasing the region of pure circular polarization within elements 11 and 12. There also appears a shift toward the narrow wall of the region of circular polarization caused by the increased asymmetrical dielectric loading of the guide, which shift is not taken into account by FIG. 2. The result, however, is a very substantial increase in the maximum reverse loss, a decrease in the forward loss and a substantial increase in the isolation ratio. Comparative performance figures for a typical embodiment in accordance with the invention will be given hereinafter.

Figure 3:
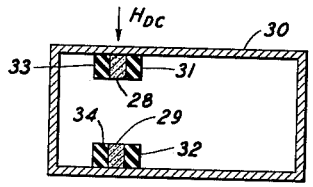

For some purposes, improved nonreciprocal performance is obtained by the modification of the structure of FIG. 1 represented by the cross sectional view of FIG. 3. Referring to FIG. 3, modification will be seen to reside in the fact that elements 33 and 34 of dielectric material are now included adjacent to ferrite elements 28 and 29 between the ferrite elements and the left-hand narrow wall of guide 30 in addition to dielectric elements 31 and 32 which correspond to elements 13 and 14 of FIG. 1. To validate the experimental comparison to be made hereinafter, dielectric elements 31 through 34 have width dimensions that are one half the width dimensions of elements 13 and 14 of FIG. 1 so that an identical amount of dielectric material is included in the embodiments of FIGS. 1 and 3.

In this position elements 33 and 34 likewise act as independent dielectric guides having longitudinal magnetic field components $H''_y$ of amplitude represented by curve 26 centered upon plane 19 of FIG. 2. The sum of components $H''_y$ and $H_y$ is represented on FIG. 2 by the dotted characteristic 27 which shows that between planes 19 and 23 the amplitude of the total longitudinal component has been decreased, thus decreasing the amplitude difference between the transverse and longitudinal components and further increasing the region of circular polarization within elements 28 and 29.

The following table shows the improvement that results in accordance with the invention by setting out the maximum reverse loss, the forward loss associated with this reverse loss and the isolation ratio of: case I, an embodiment of the prior art having gyromagnetic elements only with dimensions .037" x .100" x 4.5" and no dielectric material; case II, an embodiment in accordance with FIG. 1 having dielectric elements of dimensions .075" x .100" x 4.5" on the center plane sides of the ferrite elements of dimensions .037" x .100" x 4.5"; and case III, an embodiment in accordance with FIG. 3 having dielectric elements of dimensions .037" x .100" x 4.5" located on both sides of the ferrite elements of dimensions .037" x .100" x 4.5".

| Case | Maximum Reverse Loss, db | Forward Loss, db | Isolation Ratio |
| --- | --- | --- | --- |
| I | 36 | .50 | 72 |
| II | 73 | .55 | 130 |
| III | 62.5 | .35 | 180 |

All other critical parameters in the embodiments are held at their optimum values so that the comparison to be made is valid.

It will be noted that while case III represents a substantial increase in the isolation ratio over case II, the total reverse loss or the attenuation per unit length is reduced. This fact may be explained by the theory that while the degree of circular polarization within the ferrite element is increased, which increases the isolation ratio, the absolute amount of power concentrated within the ferrite and subject to its attenuation is decreased because so much of the power is now concentrated in the dielectric. Therefore for a particular application in which the maximum loss per unit length is desirable, the embodiment of case II or FIG. 1 is preferable. For an application in which the maximum isolation ratio is preferable, the embodiment of case III or FIG. 3 should be chosen.

Figure 4:
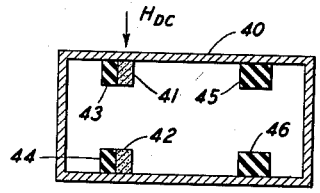

Referring to FIG. 4, single dielectric elements 43 and 44 located between ferrite elements 41 and 42, respectively, and the narrow wall of guide 40 also give satisfactory results. However, in this case it is desirable to add dielectric counterpoises 45 and 46 on the opposite side of guide 40 or otherwise satisfactorily to balance the asymmetrical dielectric loading which tends to draw the region of circular polarization unduly close to the narrow wall.

Figure 5:
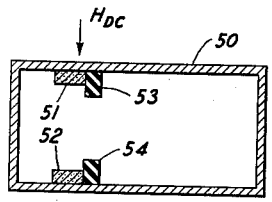

In FIG. 5 is shown an embodiment of the invention suitable for high power applications. Elements 51 and 52 of ferrite are arranged with their wide dimensions parallel to the wide walls of guide 50. The primary high power advantage stems from the fact that better heat dissipation from the ferrite to the metallic guide structure is possible. Dielectric elements 53 and 54 are located between ferrite elements 51 and 52 and the guide center line. In the preferred embodiment illustrated, dielectric elements 53 and 54 extend away from the wide wall by a distance that is somewhat greater than the smaller dimension of the ferrite elements but for certain applications it is satisfactory for dielectric elements 53 and 54 to have dimensions comparable to those of the ferrite elements. A pair of dielectric elements may also be located on the other side of each ferrite element according to the teachings of FIG. 3.

Figure 6:
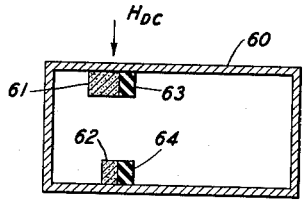
Figure 7:
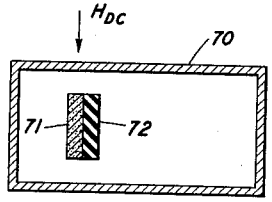

In FIG. 6 an embodiment of the invention that is similar to FIG. 1 is shown to illustrate a feature thereof by which the operating frequency band is increased. In FIG. 6 ferrite element 61 adjacent to the top wide wall of guide 60 has a dimension parallel to the wide wall that is somewhat larger than the corresponding dimension of element 62 adjacent to the bottom narrow wall of guide 60. Dielectric elements 63 and 64 are located adjacent to elements 61 and 62 and correspond to elements 13 and 14 of FIG. 1. The difference in the dimensions of elements 61 and 62 provides them with different demagnetizing factors. This means that the maximum effect of each element takes place at a slightly different frequency from the other with a consequent broadening of the operating frequency band of the device.

In each of the preceding embodiments, the invention has been represented by a structure involving two ferrite elements located adjacent to the top and bottom walls, respectively. However, the principles of the invention may likewise be applied to a structure involving a single ferrite element. Thus in FIG. 7 a single ferrite element 71 is located asymmetrically within the cross section of guide 70 to extend transversely therein for a portion of the distance between the wider walls. An element 72 of dielectric material having dimensions comparable to those of ferrite element 71 is located adjacent to the face of element 71 between element 71 and the center plane of guide 70. The performance of this embodiment in accordance with the invention is substantially similar to those of the preceding embodiments.

In the preceding embodiments the enhancement of the nonreciprocal effect of an element of ferrite by employing next to it an element of dielectric material has been explained specifically in terms of nonreciprocal gyromagnetic resonance isolators. This procedure was followed to simplify the description substantially. However, it should be apparent that the principles of the invention apply to any gyromagnetic device in which improved performance results by increasing the degree and amount of circularly polarized wave energy within a gyromagnetic element. For example, when the biasing magnetic field strength in any of the preceding embodiments is adjusted to a value other than that required to produce gyromagnetic resonance, the gyrating electrons within the material produce a phase shift and a field displacement which is also nonreciprocal in character and which also depends upon the presence of circularly polarized components within the material. Applications and uses of these phenomena are disclosed in the above-mentioned Bell System Technical Journal by A. G. Fox, S. E. Miller and M. T. Weiss.

In all cases it is understood that the above-described arrangements are illustrative or a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A dominant mode electromagnetic wave energy isolator comprising a section of rectangular wave guide for said energy having conductive top and bottom wide walls and conductive narrow side walls, a slab of magnetically polarizable material having a given dielectric constant and exhibiting gyromagnetic effects in the presence of said energy extending within said section parallel to and at unequal distances from respective narrow side walls, said slab having a transverse dimension parallel to said wide walls that extend through a first region in which said energy has transverse and longitudinal magnetic field components of equal amplitude into the region on each side of said first region in which said components are of slightly different amplitude, means for applying a magnetic biasing field to said gyromagnetic slab in a direction normal to said wide walls, a first solid self-supporting element of nonmagnetic high dielectric constant dielectric material having a dielectric constant comparable to said given dielectric constant of said gyromagnetic slab extending in contiguous relationship with said slab solely at the transverse side thereof parallel to said narrow side walls and closer to the longitudinal guide axis, said first element having transverse dimensions comparable to the transverse dimensions of said gyromagnetic slab and a transverse cross sectional area at least half the transverse cross sectional area of said slab, and means for increasing the ratio of reverse loss to forward loss in said isolator, said last recited means comprising a second solid self-supporting element of nonmagnetic high dielectric constant dielectric material having a dielectric constant comparable to said given dielectric constant of said gyromagnetic slab extending in contiguous relationship with said slab solely at the transverse side thereof parallel to said narrow side walls and further from the longitudinal guide axis, said second element having transverse dimensions comparable to the transverse dimensions of said gyromagnetic slab and a transverse cross sectional area at least half the transverse cross sectional area of said slab, the remainder of said section comprising a medium having a relatively low dielectric constant, said dielectric constant of said non-magnetic high dielectric constant dielectric material being closer to said given dielectric constant of said gyromagnetic slab than to the dielectric constant of said medium.

2. A nonreciprocal dominant mode electromagnetic wave energy component comprising a section of rectangular wave guide for said energy having conductive top and bottom wide walls and conductive narrow side walls, a slab of magnetically polarizable material having a given dielectric constant and exhibiting gyromagnetic properties in the presence of said energy extending within said section parallel to and at unequal distances from respective narrow side walls, said slab having a transverse dimension parallel to said wide walls that extends through a first region in which said energy has transverse and longitudinal magnetic field components of equal amplitude into second and third regions one on each side of said first region in which said components are of slightly different amplitude, means for applying a magnetic biasing field to said gyromagnetic slab in a direction normal to said wide walls, means for increasing the transmission loss in one direction of energy propagation through said component comprising a first solid self-supporting element of nonmagnetic high dielectric constant dielectric material having a dielectric constant comparable to said given dielectric constant of said gyromagnetic slab extending at a first side of said slab parallel to said narrow walls in a fourth region transversely adjacent and contiguous said second region, and means for increasing the ratio of transmission loss in said one direction to the transmission loss in the propagation direction opposite to said one direction comprising a second solid self-supporting element of said nonmagnetic high dielectric constant dielectric material extending at a second side of said slab parallel to said narrow walls in a fifth region transversely adjacent and contiguous said third region, said elements having transverse dimensions parallel to said wide walls comparable to said transverse dimension of said slab, the remainder of said section comprising a medium having a dielectric constant which is small compared to the high dielectric constant of said dielectric material.

References Cited in the file of this patent

UNITED STATES PATENTS

| | | |
|---|---|---|
| 2,776,412 | Sparling | Jan. 1, 1957 |
| 2,806,972 | Sensiper | Sept. 17, 1957 |
| 2,820,720 | Iversen | Jan. 21, 1958 |
| 2,846,655 | Iversen | Aug. 5, 1958 |
| 2,951,220 | Miller | Aug. 30, 1960 |